Patented July 4, 1950

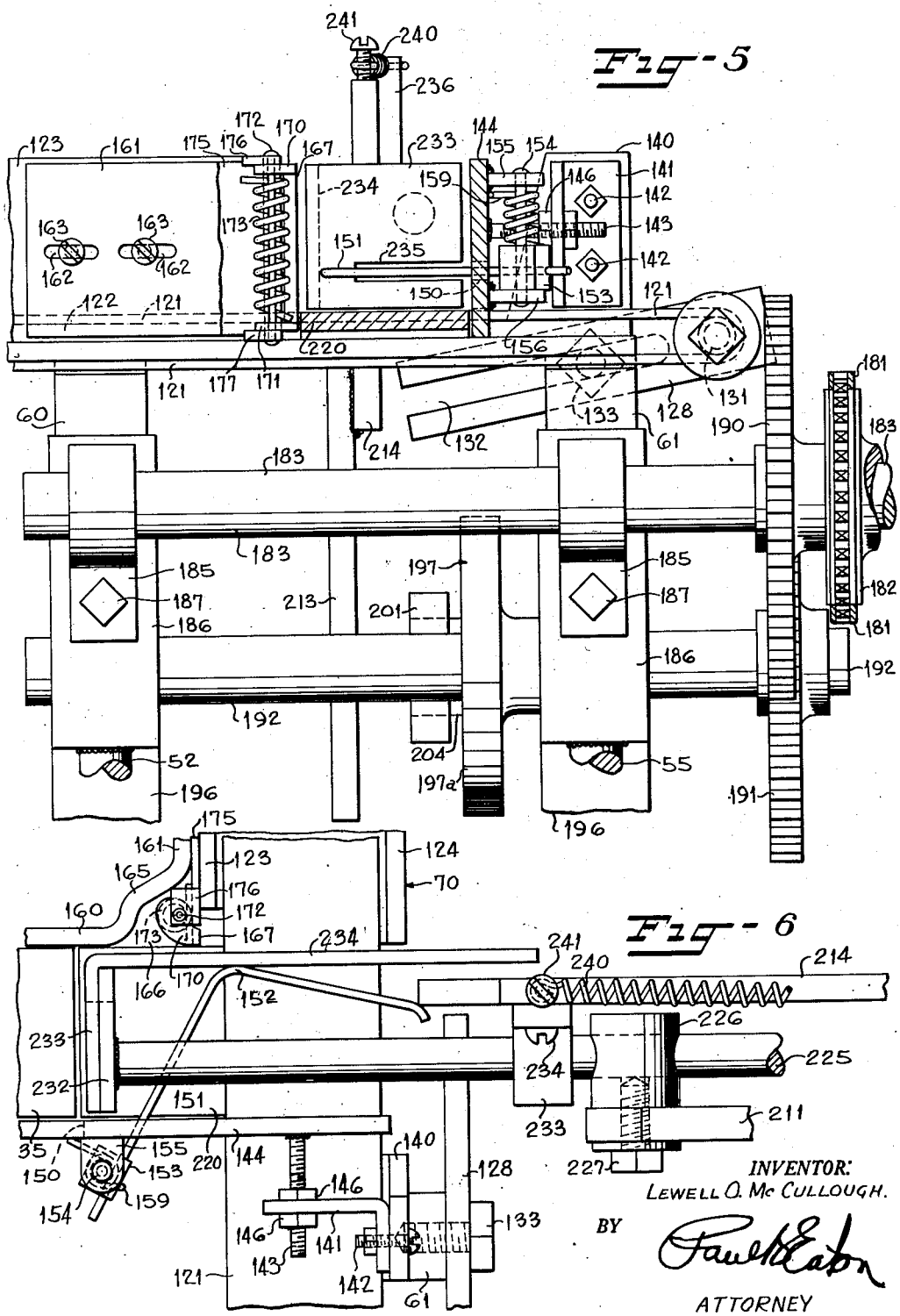

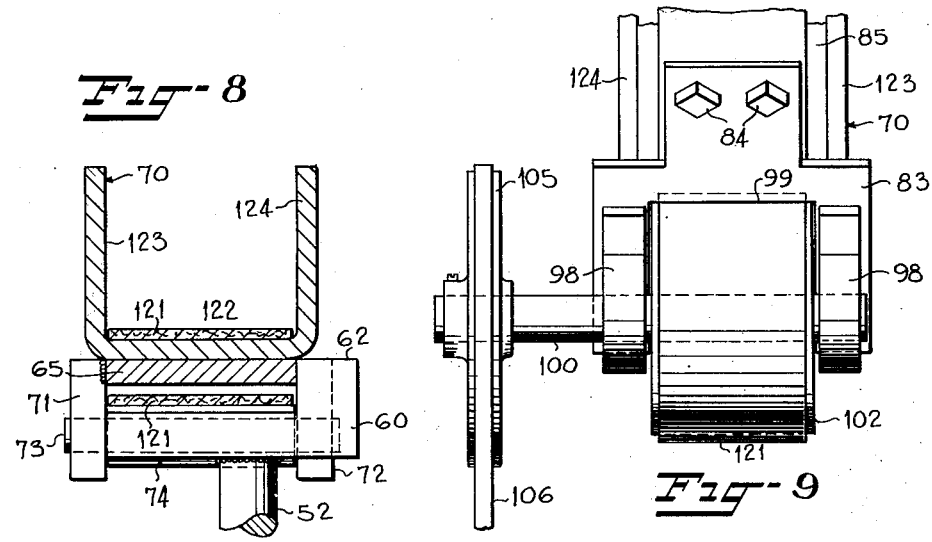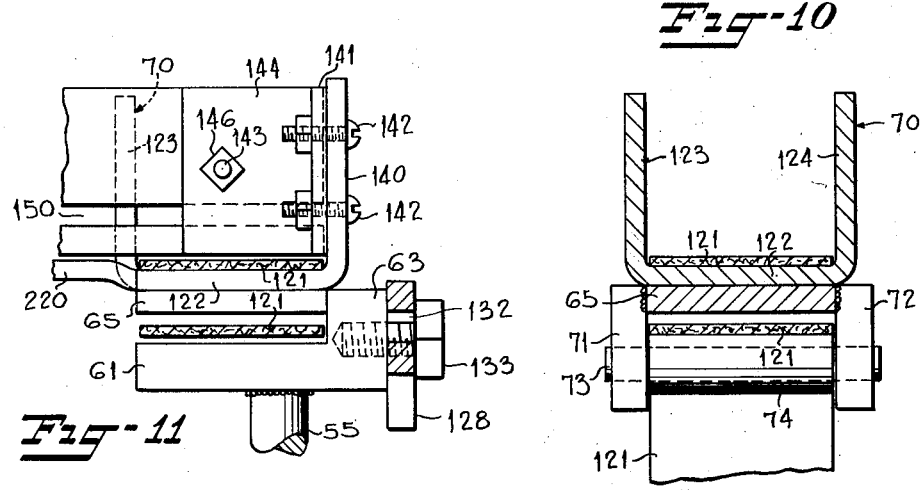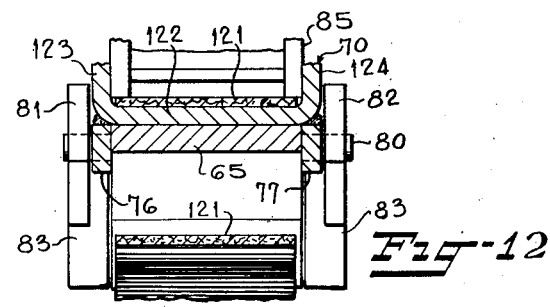

2,513,662

UNITED STATES PATENT OFFICE 2,513,662

RECIPROCATING PUSHER TRANSFER DEVICE

Lewell O. McCullough, Charlotte, N. C., assignor to Lance, Inc., Charlotte, N. C., a corporation of North Carolina Application October 5, 1948, Serial No. 52,950

3 Claims. (Cl. 198—31)

This invention relates to a mechanism for intermittently feeding a predetermined number of articles from a stack of articles, such as peanut butter crackers, cookies, cakes, sandwiches or the like, the stack of articles being disposed, preferably on edge, in a juxtaposed relation to each other on a conveyor whereby the feeding mechanism feeds a predetermined number of the articles onto a second conveyor for feeding the articles into a suitable packaging or wrapping machine.

It is an object of this invention to provide a constantly driven conveyor onto which sandwiches or the like are fed from a sandwich making machine or the like, the width of the conveyor being substantially the same as the width of a sandwich, and to provide a second conveyor disposed at right angles to the first conveyor and to provide means for automatically feeding a predetermined number of the sandwiches from the first conveyor to the second conveyor in rapid succession, whereby the sandwiches are positioned on the second conveyor in side by side relation to each other for feeding the sandwiches to a suitable packaging machine or wrapping machine or the like.

It is another object of this invention to provide means disposed in the path of travel of the sandwiches on the first conveyor for arresting movement of the same and to provide a reciprocating bar which reciprocates across a portion of the first conveyor onto a second conveyor, which moves in step by step relation, for delivering the sandwiches to a suitable wrapping machine or the like, and whereby as the reciprocating bar moves across the first conveyor in a feeding operation, the reciprocating bar has means thereon to prevent the sandwiches which are not in the path of travel of the same from moving along with the first conveyor and upon the reciprocating bar moving out of the path of travel of the sandwiches, the sandwiches will again advance to engage the first-named means for arresting movement of the sandwiches for a repeat operation.

Some of the objects of the invention having been stated, other objects will appear as the description proceeds, when taken in connection with the accompanying drawings, in which:

Figure 5 is an enlarged vertical sectional view with parts broken away and being taken substantially along the line 5—5 in Figure 1;

Figure 6 is an enlarged top plan view of the central portion of Figure 1 and showing the parts in the same position as shown in Figure 4;

Figure 7 is a top plan view similar to Figure 6, but showing the parts in still another position, and showing the sandwiches on the first conveyor;

Figure 8 is an enlarged vertical sectional view through the first conveyor and is taken substantially along the line 8—8 in Figure 2;

Figure 9 is an enlarged elevation being taken looking substantially along the line 9—9 in Figure 2;

Figure 10 is an enlarged vertical sectional view being taken substantially along the line 10—10 in Figure 2;

Figure 11 is an enlarged vertical sectional view taken substantially along the line 11—11 in Figure 2;

Figure 12 is an enlarged vertical sectional view taken substantially along the line 12—12 in Figure 2.

Figure 1:
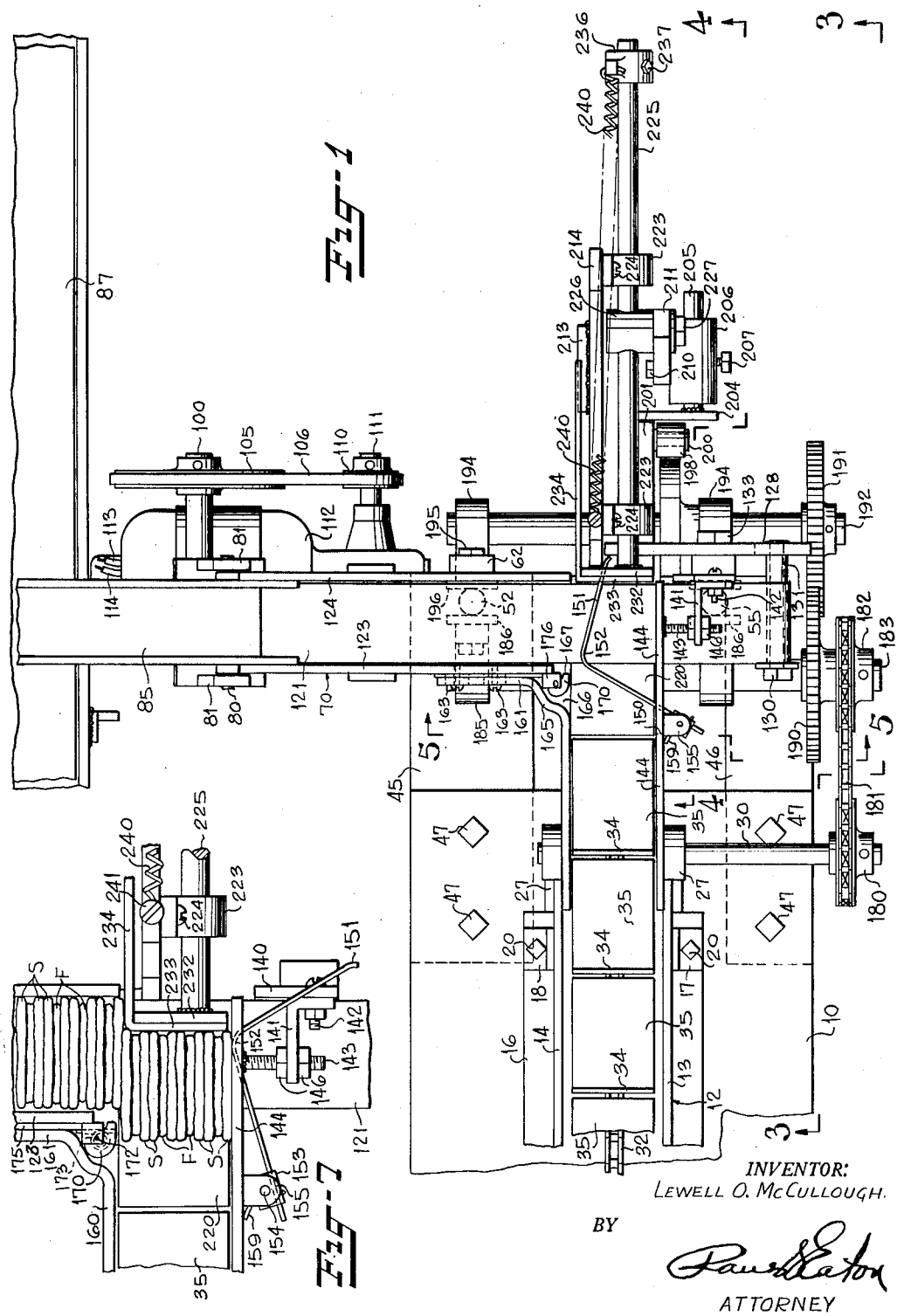
Figure 1 is a top plan view of the feeding mechanism with portions of the conveyors being broken away.
Figure 3:
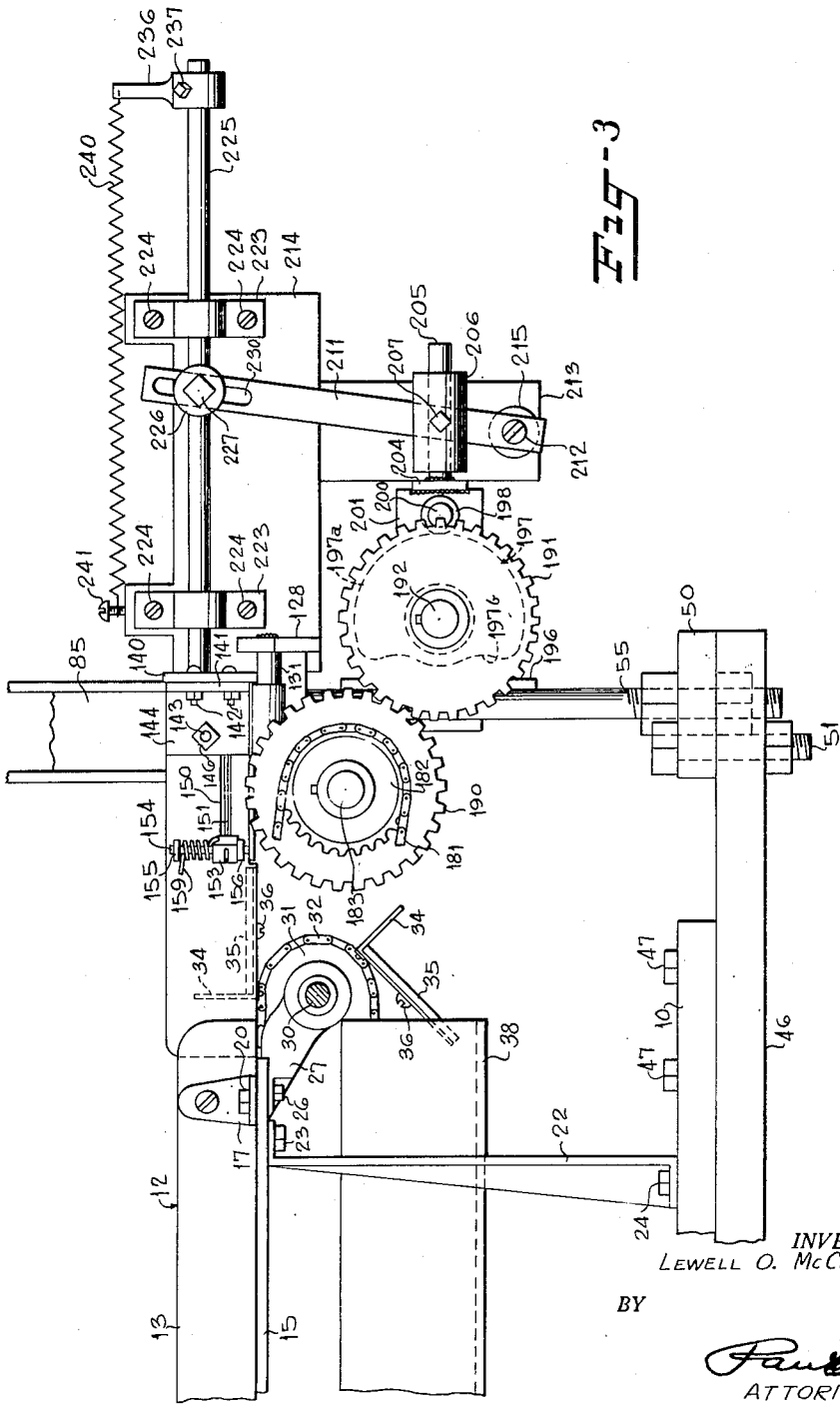
Figure 3 is an elevation parts in section and being taken substantially along the line 3—3 in Figure 1.

Referring more specifically to the drawings and more especially to Figures 1 and 3, there may be observed a portion of a plate member 10. This plate member 10 is a conventional part of a wrapping machine, such as is manufactured by the Wright's Automatic Machinery Company, Durham, North Carolina, for wrapping peanut butter sandwiches or the like, the present invention being provided as a means for automatically feeding the sandwiches to a conveying apparatus in predetermined quantities and in step by step timed relation with movement of this conveyor apparatus. A portion of the conveyor apparatus, which is a part of the said wrapping machine, not shown, is shown in Figures 1 and 3 and is broadly designated by the reference character 12. A description of the aforesaid wrapping machine is given in a Pamphlet No. DB-P-1, printed for Wright's Automatic Machinery Company and entitled, "May-Plex Cellophane Wrapper," and a further description of the wrapping machine is thus deemed unnecessary.

The conveying apparatus 12 comprises side rails 13 and 14 (Figures 1 and 3), the lower edges of which are supported on elongated bars 15 and 16, respectively, and these side rails are secured to the bars 15 and 16 by angle clips 17 and 18, respectively, which are, in turn, secured to the side rails and the elongated bars as by screws 20. The right-hand ends of the bars 15 and 16 are each supported on a standard 22, only one of which is shown (Figure 3). The upper ends of the standards 22 are secured, as by screws 23, to the bars 15 and 16 and are secured at their lower ends as by screws 24 to the plate 10.

Secured to the right-hand ends of the elongated bars 15 and 16, as by screws 26, are bearing blocks 27 (Figures 1 and 3) in which a shaft 30 is rotatably mounted. The shaft 30 has a sprocket wheel 31 fixedly mounted thereon and being disposed between the bearing blocks 27 and this sprocket wheel 31 has the right-hand end of the sprocket chain 32 being mounted on conventional parts, not shown, of the aforesaid wrapping machine.

Secured to certain spaced links of the chain 32 are angle plates 34 each having a plate 35 secured thereto as by a screw 36. The lower reach of the sprocket chain 32 and the angle plates 34 thereon pass between the vertical side walls of a guide member 38 which is substantially U-shaped in cross-section. The parts heretofore described are conventional parts of the conveyor 12, which is a portion of the aforesaid wrapping machine and it is with these parts that this invention is adapted to be associated.

Figure 2:
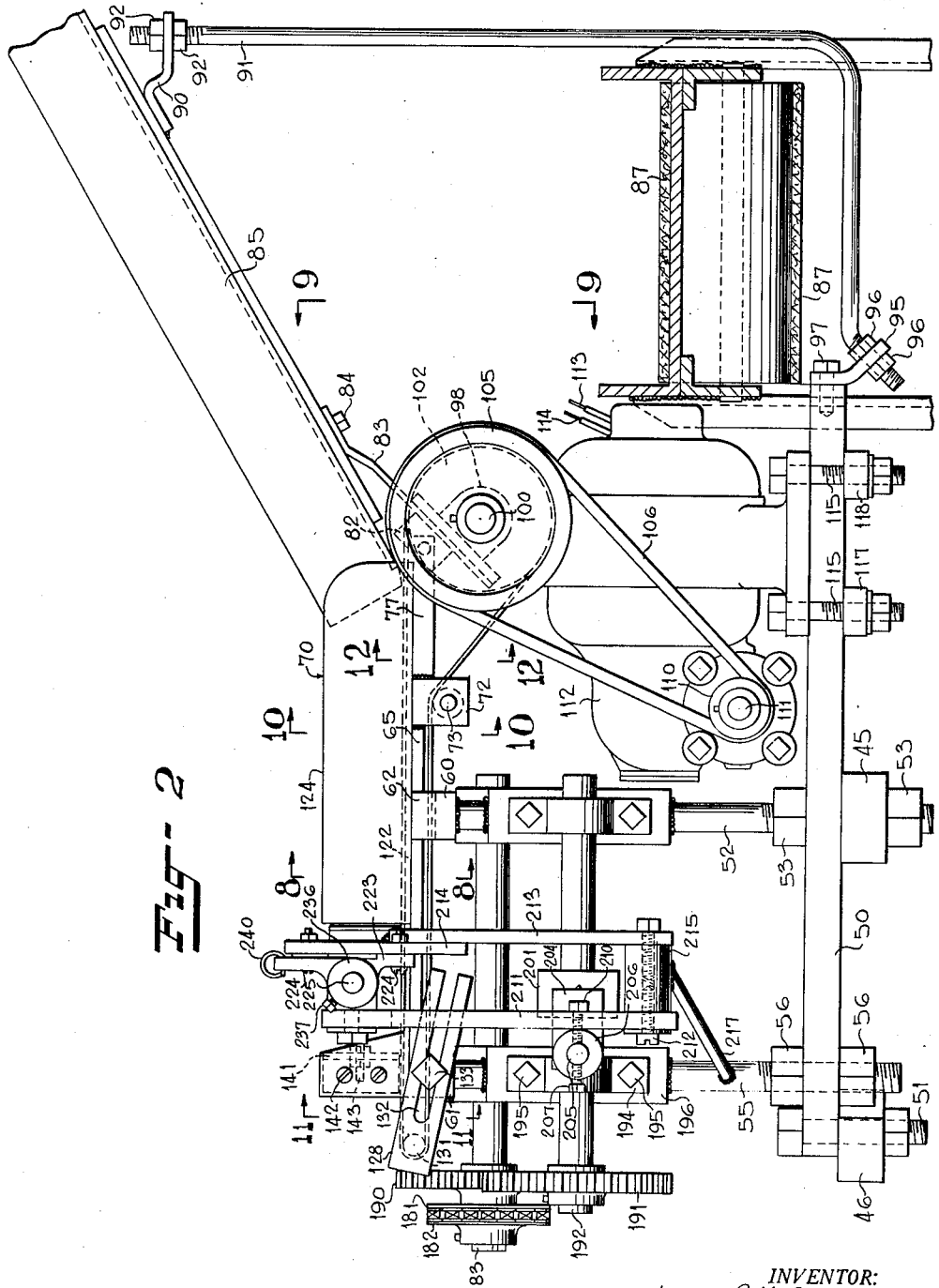
Figure 2 is an elevation looking from the right-hand side of Figure 1 to the left and showing the conveyor in the upper portion of Figure 1 in cross section.

Referring to Figures 1, 2 and 3 there may be observed horizontally disposed bars 45 and 46 which are secured to the lower surface of the plate 10, as by screws 47 and these bars 45 and 46 extend outwardly and the bar 46 has secured on the right-hand end thereof in Figure 3 one end of a transverse bar 50, as by a bolt 51. The bar 50 is slidably penetrated intermediate its ends by a vertically disposed rod 52 (Figure 2) which also penetrates the outer end of the bar 45 and nuts 53 are threadably mounted on the rod 52 and engage the lower surface of the bar 45 and the upper surface of the bar 50 to thus secure them together as well as to rigidly support the vertically disposed rod 52.

A rod 55, similar to the rod 52, slidably penetrates the bar 50 adjacent its left-hand end in Figure 2 and is secured therein by lock nuts 56 threadably mounted on the lower end of the rod 55 and which engage opposite surfaces of the bar 50. Welded to the upper ends of the vertically disposed rods 52 and 55 are transverse bars 60 and 61, respectively, the right-hand ends of which in Figures 4, 8 and 11 have upwardly projecting portions 62 and 63, respectively, integral therewith. Welded to the left-hand surface of the upwardly projecting portions 62 and 63 of the bars 60 and 61, respectively, is the right-hand edge of a plate 65 which is a part of a conveyor broadly designated at 70.

Referring to Figures 8 and 10 it may be observed that the plate 65 has ears 71 and 72 welded to opposite sides thereof and extending downwardly therefrom and in which a rod 73 is rotatably mounted, having an idler roller 74 integral therewith, the purpose of which will be later described.

The plate 65 also has bars 76 and 77 welded to opposite edges thereof which extend beyond the right-hand end of the same in Figure 2 and support a rod 80 (Figure 12). The rod 80 penetrates and extends outwardly beyond each side of the bars 76 and 77 in Figure 12 and has ears 81 and 82 oscillatably mounted thereon, the lower edges of which are welded to an angularly disposed plate 83. This plate 83 is secured as by screws 84 (Figures 2 and 9) to an angularly disposed trough or chute 85 which extends from left to right upwardly at an angle in Figure 2 and extends over a suitable driven conveyor 87 which extends from a suitable machine, not shown, in which the sandwiches are formed as the various ingredients comprising the sandwiches pass therethrough. As the sandwiches pass adjacent the inclined trough 85, they are picked off the conveyor 87 by an operator and placed in the trough 85 down which they slide, by gravity, and pass onto the conveyor belt or strap to be presently described.

The right-hand end of the trough 85 has a clip 90 welded to the lower surface of the same which is slidably penetrated by a rod 91 secured in the clip 90 by lock nuts 92 threadably mounted on the same. This rod 91 extends downwardly and curves at right angles and then extends to the left in Figure 2 and is bent downwardly at an angle and slidably penetrates a clip 95 to which it is secured by lock nuts 96. The clip 95 is secured as by a screw 97 to the right-hand end of the bar 50 in Figure 2. The purpose of the rod 91 is to support the free end of the trough 85.

The plate 83 (Figures 2 and 9) has an opening 99 therein on each side of which suitable bearing blocks 98 are welded. The bearing blocks 98 have a shaft 100 rotatably mounted therein on which a pulley 102 is fixedly mounted. The shaft 100 has a V-pulley 105 fixedly mounted on one end thereof and this V-pulley 105 is engaged by a V-belt 106 which extends downwardly and engages a smaller V-pulley 110. The V-pulley 110 is fixedly mounted on a shaft 111 extending from a conventional ratiomotor of a type such as is manufactured by Boston Gear Works, Inc., 14 Hayward Street, North Quincy 71, Massachusetts, and is shown in their Catalogue No. 54 on page 162, which is a conventional reduction gear motor.

The ratiomotor 112 has electric wires 113 and 114 extending from the same to a suitable source of electrical energy, not shown. The ratiomotor 112 is clamped on the bar 50 by means of bolts 115 which penetrate opposite ends of bars 117 and 118 which pass beneath the bar 50 to thus clamp the motor 112 on the bar 50.

The pulley 102 has mounted thereon a conveyor tape 121 the upper reach of which passes into a substantially U-shaped trough 122 having side walls 123 and 124. The left-hand portion of the conveyor tape 121, in Figure 2, is mounted on a roller 131 which is rotatably mounted on a headed pin 130 (Figure 1) the right-hand end of which penetrates and is welded to a forked member 128 having an adjustment slot 132 therein which is penetrated by a screw 133 threadably imbedded in the right-hand end of the bar 61 in Figures 1 and 11. The U-shaped trough member comprising side walls 123 and 124 is secured on the top surface of the horizontally disposed plate 65, by any suitable means such as spot welding. It will be noted in Figure 1 that the left-hand side wall 123 of the trough 122 is somewhat shorter in length than the right-hand side wall 124 and the bottom of the trough 122 extends a substantial distance beyond the side walls 123 and 124 to the outer or left-hand edge of the bar 61 in Figure 2.

The trough 122 has an upwardly bent portion 140 at its left-hand end in Figure 2 to which an angle clip 141 is secured as by bolts 142 (Figures 1, 2, 3, 5, 6 and 7). The angle clip 141 is slidably penetrated by a stud 143 welded to an adjustable guide plate 144 which extends over the conveyor tape 121 in Figures 1 and 6 and extends to the left in Figure 1 to serve as a guide as the sandwiches, indicated at S in Figure 7, are moved off the conveyor tape 121, by means to be later described, and onto the plates 35 of the conveyor 12. The stud 143 is the sole means of support for the side rail 144 and has lock nuts 146 threadably mounted thereon and engaging opposite sides of the angle clip 141 for securing the guide rail 144 in the desired adjusted position.

Referring to Figure 3, it may be observed that the guide rail 144 has an elongated slot 150 therein which is loosely penetrated by a finger 151 which extends inwardly and is curved, as at 152, over the conveyor tape 121. The other end of this finger 151 is secured as, by a pressed fit, in a block 153 oscillatably mounted on a pin 154 secured, as by a pressed fit, in spaced outwardly extending ears 155 and 156 welded to the guide rail 144. A torsion spring 160 is disposed around the pin 154 between the upper end of the block 153 and the upper end of the ear 155 in Figures 3 and 5 and engages the guide rail 144 at one end thereof and the other end of the torsion spring 160 engages the block 153 to thus urge the finger 151 in a counterclockwise direction in Figures 1, 6, and 7.

The purposes of the finger 151 is to engage the sandwich S nearest the guide bar 144 in Figures 1 and 6, as the sandwiches are fed by the endless conveyor 121 (Figure 2). The finger engages the sandwich S adjacent the lower edge of the same to thus prevent the sandwiches from falling over as they are moved towards the guide member 144 by the conveyor tape 121. The torsion in the spring 159 is very light and therefore the frictional contact between the sandwiches and the conveyor tape 121 will suffice to overcome the resistance of the torsion spring 159 and the finger 151. An L-shaped guide rail 160 is disposed on the opposite side of the plate members 34 of the conveyor 12 and this L-shaped guide member 160 has a leg 161 (Figures 1 and 5) having slots 162 therein which are slidably penetrated by screws 163 for adjustably securing the L-shaped guide member 160 to the vertical side wall 123 of the trough 122.

The L-shaped guide rail 160 is bent outwardly as at 165 to thus form an opening 166 (Figure 1) and in which a pivoted cam member 167 is disposed. This cam member 167 is provided to assist in guiding the sandwiches S from the conveyor tape 121 onto the plate member 35 as will be later described. The cam member 167 (Figures 1, 5, and 6) has ears 170 and 171 integral therewith which are slidably penetrated by a pin 172 which also spans the distance there-between and has a torsion spring 173 surrounding the same. This torsion spring engages the surface of the cam member 167 nearest the observer in Figure 5 and the upper end of the torsion spring 173 engages a vertically disposed plate 175 having ears 176 and 177 integral therewith, the proximate surfaces of which engage the remote surfaces of the ears 170 and 171, respectively, of the pivoted cam member 167.

The plate 175 has slots therein which coincide with the slots 162 in the leg 161 of the L-shaped guide member 160 and these coinciding slots are also slidably penetrated by the screws 163 and it is thus seen that these screws 163 also serve to secure the plate 175 to the vertical side wall 123 of the trough 122.

The conveyor sprocket chain 32 which is a part of the conveyor 12 integral with the said wrapping machine, is driven by means, not shown, associated with the said wrapping machine and therefore transmits rotation to the sprocket wheel 31 and, in turn, to the shaft 30. The shaft 30 has a sprocket wheel 180 on the lower end thereof in Figure 1, and this sprocket wheel 180 has a sprocket chain 181 mounted thereon which extends to and is mounted on a sprocket wheel 182 fixedly mounted on a shaft 183. The shaft 183 (Figures 1, 4 and 5) is rotatably mounted in bearing blocks 185 secured to plates 186 welded to the rods 52 and 55. The bearing blocks 185 are secured to the plates 186, as by screws 187.

The shaft 183 has fixedly mounted thereon an idler gear 190 which meshes with a gear 191 fixedly mounted on a shaft 192 (Figures 1, 2, 3 and 5). The shaft 192 is rotatably mounted in bearing blocks 194 secured, as by screws 195, to plates 196 welded to the rods 52 and 55 and being disposed on the side of the rods 52 and 55 opposite from that side on which the plates 186 are welded.

The shaft 192 has a cam wheel 197 fixedly secured thereon which has an arcuate portion 197a with a large radius and an arcuate portion 197b with a smaller radius. The cam wheel 197 engages a cam follower 198 rotatably mounted on a shoulder pin 200 projecting from a forked member 201 the forked end of which straddles the shaft 192 to thus serve as a guiding means for the fork member 201 during its reciprocatory movement. This fork member 201 has a bar 204 welded to the same (Figures 1, 3, 4 and 6) to which a stub shaft 205 is welded and this shaft 205 has a cuff member 206 fixedly mounted thereon as by a set screw 207.

The cuff member 206 has a shoulder screw 210 threadably imbedded therein and on which a medial portion of a lever arm 211 is oscillatably mounted. This lever arm 211 extends downwardly in Figure 4 and is pivotly mounted as at 212 on a bar 215, secured as by a screw 216 (Figure 2) to a plate 213. The plate 213 extends upwardly and is welded to a larger plate 214 which is secured as by welding at its left-hand edge thereof, in Figure 4, to the bottom portion of the trough 122. A rod 217 is welded at opposite ends to the bar 215 and the rod 55 to lend rigidity to the plates 213 and 214.

Attention is called to the fact that the left-hand side of the bottom of the trough 122 is bent downwardly to form a plate member 220 across which the sandwiches S pass as they are moved from the conveyor tape 121 onto the plates 35 of the conveyor 12, by means to be presently described.

The plate 214 has guide blocks 223 secured thereon as by screws 224 and in which a shaft 225 has horizontal sliding movement. The shaft 225 has a cuff member 226 adjustably mounted thereon, as by a set screw 227. The lever arm 211 has a slot 230 at its upper end thereof, in Figure 4, and this slot 230 is slidably penetrated by the set screw 227 and it is thus seen that as the cam wheel 197 rotates in one direction or the other in Figure 4 and as the arcuate surface 197a of the cam wheel engages the cam follower 198, the lever arm 211 is moved from the position shown in Figure 4 to the position shown in Figure 3. In so doing, this will, of course, move the shaft 225 from left to right or from the position shown in Figure 4 to that shown in Figure 3.

Figure 4:
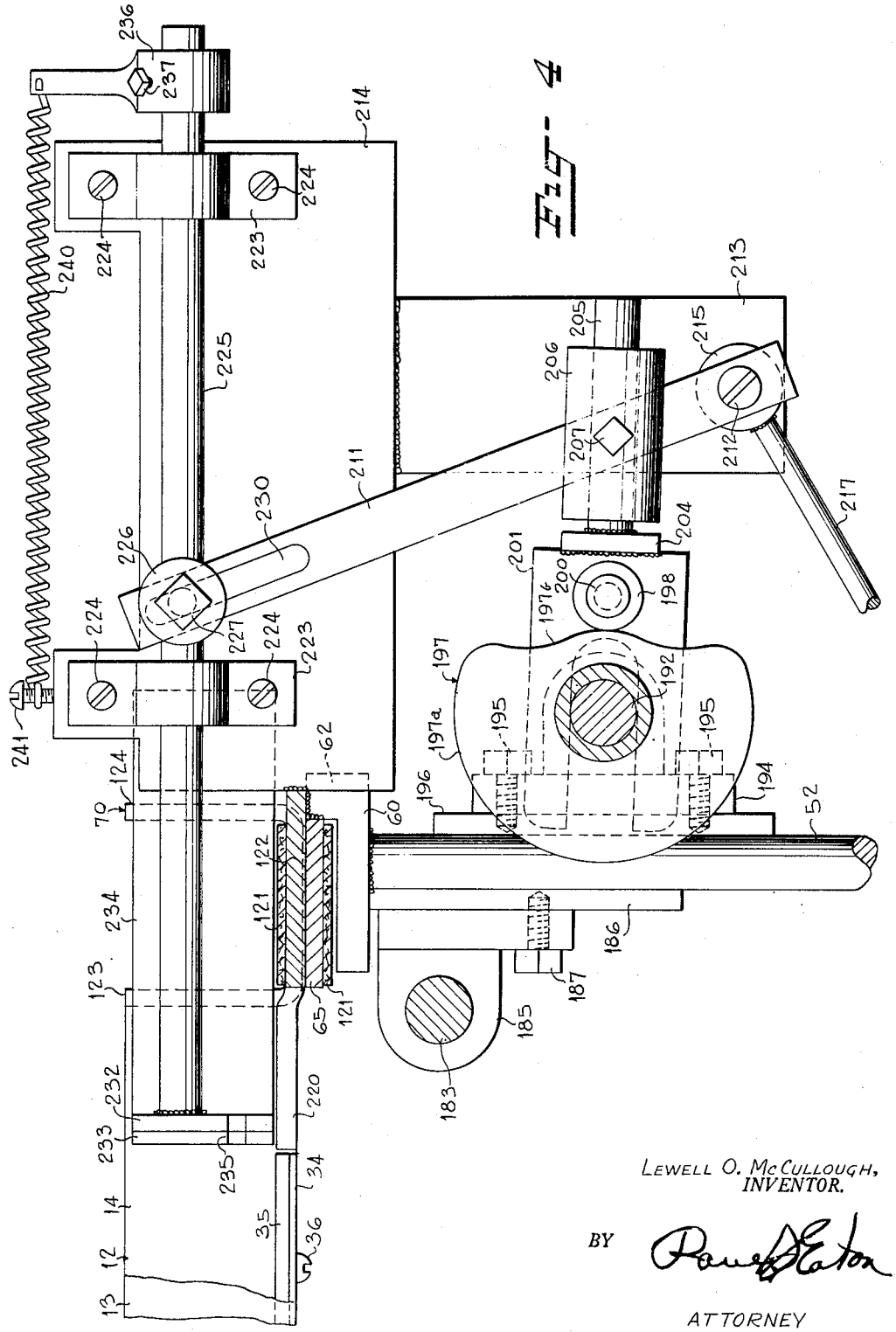
Figure 4 is an enlarged vertical sectional view showing the parts in different relative positions from that shown in Figures 1 and 3 and with other parts being broken away and being taken substantially along the line 4—4 in Figure 1.

The shaft 225 has a plate 232 welded on the left-hand end thereof in Figures 1, 4 and 6 and this plate 232 has a plate 233 secured thereto, as by spot welding, and this plate 233 has a horizontally disposed guide plate 234 integral therewith and being disposed at right angles to the plate 233.

The plates 232 and 233 have coinciding slots 235 therein which are loosely penetrated by the free end of the finger 151. The shaft 225 also has a spring perch 236 adjustably mounted thereon as by a set screw 237 and this spring perch extends upwardly in Figure 4 and has one end of a tension spring 240 connected thereto the other end of which is connected to a suitable spring perch 241 mounted on the upper edge of the plate 214 in Figure 4. It is thus seen that the tension spring 240 will urge the shaft 225 and associated parts towards the left in Figure 4 and will also cause the cam follower 198 to remain in engagement with the cam wheel 197 at all times.

*Method of operation*

In the operation of this device the reduction gear motor 112 transmits rotation to the V-pulley 110 at all times thereby transmitting continuous movement from right to left of the upper reach of the conveyor tape 121 in Figure 2. The sprocket chain 32 of the conveyor 12 is caused by the said wrapping machine to move in step by step relation and this will, of course, transmit step by step rotation through the sprocket wheels 180 and 182 and the sprocket chain 181 to the shaft 183 on which the gear 190 is mounted and this gear 190 will transmit rotation to the shaft 192 through the gear 191.

It is thus seen that the cam wheel 197 will be caused to rotate in step by step relation, completing one revolution upon each step of rotation of the shaft 192. An operator picks the sandwiches S or the like, off of the conveyor 87 and places them in the chute or trough 85 and the sandwiches S then slide, by gravity, onto the conveyor tape 121 and are thus carried along the conveyor tape to where the first of the sandwiches S engages the portion 152 of the finger 151 to prevent it and the sandwiches thereagainst from falling over, as has heretofore been described. The sandwiches S then move the finger 151, from the position shown in Figure 1, in a clockwise direction to where the first of the sandwiches will engage the guide rail 144 (Figure 1). A step in rotation is then imparted to the cam wheel 197 in the manner heretofore described to thus cause the shaft 225 to move from the position shown in Figure 3 to the position shown in Figure 4 and thus the plate 233 will engage the edges of the sandwiches disposed in the path of the same and will move the same from right to left in Figures 1, 4 and 6 to where the sandwiches S will be moved onto the plate 220 and finally onto an adjacent plate 35 of the conveyor 12.

Now as the plate 233 moves from the position shown in Figure 3 to the position shown in Figures 4 and 6, the plate 234 crosses the path of the sandwiches on the conveyor tape 121 thus preventing the sandwiches from moving back of the plate 232, where they would interfere with the return stroke of the shaft 225 and associated parts. It will be noted in Figure 6 that as the sandwiches are moved off the conveyor tape 121 in a manner heretofore described, the portion 152 of the finger 151 is urged by the torsion spring 159 to where the portion 152 will engage the vertical surface of plate 234 and upon the return stroke of the shaft 225 and associated parts the finger 151 is straddled by the walls of the slot 235 in the plates 232 and 233 and it is obvious that when the plate 233 has again returned to the position shown in Figure 1 the finger 151 will again be engaged by the first of the sandwiches S on the conveyor tape 121 to thus repeat the operation as heretofore described.

Due to the fact that the combined thickness of the sandwiches in the path of the plate 233, which in this instance is four sandwiches, is variable, it is necessary that the guide rails 144 and 160 be adjustable in the manner heretofore described. However, this adjustment in many instances, is not satisfactory to constant operation of the apparatus in that some of the sandwiches may be considerably thicker than others, and therefore, the pivoted cam member 167 is provided. Referring to Figure 6 it may be observed that as the plates 232 and 233 move from right to left, in the manner heretofore described, the vertical portion of the pivoted cam member 167 would engage the left-hand edge of the sandwich S which may project out of the path of the plate 233. This pivoted cam member 167, being urged in a counterclockwise direction in Figures 1, 5 and 7 by the torsion spring 173 will, upon being engaged by the portion of the sandwich S projecting beyond the plates 233 and 234, be moved in a clockwise direction in Figure 6 and will thus serve to urge the sandwich toward the guide rail 144 as the sandwich moves the pivoted cam member 167 out of its path and it is thus seen that the pivoted cam member 167 would engage the face of the sandwich nearest the guide rail 160 to press the same toward the guide rail 144 and to thus permit the sandwich S to pass by the guide rail 160 and to be properly alined for being moved onto the plates 35 of the conveyor 12.

Were it not for this pivoted cam member 167, the sandwich nearest the guide rail 160 would engage the proximate edge of the guide rail 160 as it is moved from right to left in Figures 1 and 6 and this would probably cause a portion of the sandwich to be separated from the main portion thereof and would also cause filling F between the slices of material making up a sandwich to become lodged against the proximate edge of the guide rail 160 and as a result the machine would have to be stopped and thoroughly cleaned before the operation may again be repeated as hereinbefore described.

In the drawings and specification there has been set forth a preferred embodiment of the invention, and although specific terms are employed, they are used in a generic and descriptive sense only, and not for purposes of limitation, the scope of the invention being defined in the claims.

I claim:

1. Apparatus for moving a plurality of sandwiches disposed in side by side relation onto a conveyor associated with a wrapping machine comprising a sloping chute into which the sandwiches are adapted to be disposed on edge and in side by side relation, an endless conveyor disposed below the lower end of the chute and onto which the sandwiches while disposed on edge are adapted to be delivered from the chute and to be moved away from the lower end of the chute by the endless conveyor, a pair of upright spaced members disposed on the side edges of the conveyor and forming a channel along which the sandwiches are moved by the endless conveyor, a transverse wall member at the end of the endless conveyor remote from the lower end of the chute and against which the sandwiches while disposed on edge are moved by the movement of the endless conveyor, the conveyor associated with the wrapping machine being disposed in close proximity to the discharge end of the endless conveyor and the wall on one side of the endless conveyor adjacent the conveyor associated with the wrapping machine having an opening therein, a horizontally reciprocable plunger adapted to move across the endless conveyor and to engage a plurality of sandwiches disposed side by side upon their edges and to move onto the conveyor associated with the wrapping machine, a resilient finger mounted adjacent the discharge end of the endless conveyor and adapted to press against the endmost of the sandwiches disposed on the endless conveyor which is remote from the lower end of said chute to hold the sandwiches in upright position and being spring pressed to move against the endmost sandwich on the conveyor after a plurality of the same have been removed by the reciprocable plunger to hold the sandwiches in erect position while the plunger is moving back and forth across the endless conveyor, the resiliency of said spring moving said finger being such as to allow the pressure of the sandwiches disposed on the endless belt to move it along with the endmost sandwich until the endmost sandwich has reached the wall closing the end of the endless conveyor thereby positioning a plurality of additional sandwiches in the path of the reciprocable plunger after it has made a complete travel back and forth towards and from the conveyor associated with the wrapping machine.

2. Apparatus for feeding a plurality of sandwiches and the like in a bunch to a conveyor associated with a wrapping machine comprising a constantly moving endless conveyor onto the upper reach of which the sandwiches are adapted to be fed to stand on edge in side-by-side relation to each other, arresting means disposed above the upper reach of the conveyor for arresting movement of the sandwiches as the conveyor continues to move past the arrested sandwiches, a reciprocable plunger adapted to pass across and above the constantly moving conveyor adjacent the arresting means for removing a predetermined number of the sandwiches disposed adjacent the arresting means from the conveyor and bearing the same onto the conveyor associated with the wrapping machine, a resiliently mounted finger for engaging the sandwich on the endless conveyor nearest the arresting means immediately after the plunger has withdrawn from removing the plurality of sandwiches from the constantly moving conveyor to thereby hold the sandwiches in erect position as they move toward the arresting means and until the sandwich nearest the arresting means engages the arresting means in readiness for a repeat operation.

3. Apparatus for moving a plurality of sandwiches disposed in side-by-side relation onto a conveyor associated with a wrapping machine comprising a sloping chute into which the sandwiches are adapted to be disposed on edge and in side-by-side relation, an endless conveyor disposed below the lower end of the chute and onto which the sandwiches while disposed on edge are adapted to be delivered from the chute and to be moved away from the lower end of the chute by the endless conveyor, a pair of upright spaced members disposed on the side edges of the conveyor and forming a channel along which the sandwiches are moved by the endless conveyor remote from the lower end of the chute and against which the sandwiches while disposed on edge are moved by the movement of the endless conveyor, the conveyor associated with the wrapping machine being disposed in close proximity to the discharge end of the endless conveyor and the wall on one side of the endless conveyor adjacent the conveyor associated with the wrapping machine having an opening therein, a horizontally reciprocable plunger adapted to move across the endless conveyor and to engage a plurality of sandwiches disposed side-by-side upon their edges and to move the sandwiches onto the conveyor associated with the wrapping machine, spring loaded cam means disposed in the said opening at the juncture of the endless conveyor and the conveyor associated with the wrapping machine for engaging the sandwich being moved off of the conveyor which is disposed nearest the feed end of the endless conveyor in the event that a portion of the sandwich projects beyond the limits of the reciprocable plunger to thereby compress the sandwich slightly in a direction toward the discharge end of the conveyor and to thereby insure that the plurality of sandwiches moved onto the conveyor associated with the wrapping machine will not project beyond the limits of the conveyor onto which they are passed.

LEWELL O. McCULLOUGH.

REFERENCES CITED

The following references are of record in the file of this patent:

UNITED STATES PATENTS

| Number | Name | Date |
| --- | --- | --- |
| 1,843,453 | Littlefield | Feb. 2, 1932 |
| 2,016,820 | Milmoe | Oct. 8, 1935 |
| 2,299,504 | Sergent | Oct. 20, 1942 |
| 2,315,670 | Tascher et al. | Apr. 6, 1943 |
| 2,434,772 | Sandberg | Jan. 20, 1948 |